US012708579B2

(12) United States Patent
Ham et al.

(10) Patent No.: US 12,708,579 B2
(45) Date of Patent: Aug. 18, 2026

(54) INCUBATOR

(71) Applicant: JW Pharmaceutical Corporation, Gwacheon-si (KR)

(72) Inventors: Baek-Ki Ham, Incheon (KR); Dong-Soo Jeong, Incheon (KR); Jae-Hyeong Park, Gyeonggi-do (KR)

(73) Assignee: JW Pharmaceutical Corporation, Gwacheon-si (KR)

( * ) Notice: Subject to any disclaimer, the term of this patent is extended or adjusted under 35 U.S.C. 154(b) by 971 days.

(21) Appl. No.: 17/911,002

(22) PCT Filed: Mar. 24, 2021

(86) PCT No.: PCT/KR2021/003665
§ 371 (c)(1),
(2) Date: Sep. 12, 2022

(87) PCT Pub. No.: WO2021/194264
PCT Pub. Date: Sep. 30, 2021

(65) Prior Publication Data

US 2023/0091711 A1 Mar. 23, 2023

(30) Foreign Application Priority Data

Mar. 25, 2020 (KR) ........................ 10-2020-0036127

(51) Int. Cl.
*A61G 11/00* (2006.01)

(52) U.S. Cl.
CPC ........ *A61G 11/009* (2013.01); *A61G 2200/14* (2013.01); *A61G 2200/32* (2013.01)

(58) Field of Classification Search
None
See application file for complete search history.

(56) References Cited

U.S. PATENT DOCUMENTS 3,357,545 A * 12/1967 Kobernick .............. B65B 29/10 220/501
5,826,846 A * 10/1998 Buccieri ............ F16M 11/2014 248/278.1
(Continued)

FOREIGN PATENT DOCUMENTS

DE 102010014561 A1 11/2010
EP 2221036 A1 8/2010
(Continued)

OTHER PUBLICATIONS

Office Action issued in German Patent Application No. 11 2021 001 846.9, dated May 9, 2025 [6 Pages].

*Primary Examiner* — Joanne M Rodden
(74) *Attorney, Agent, or Firm* — IceMiller LLP

(57) ABSTRACT

The present invention relates to an incubator comprising: a main body part which has a space formed therein for accommodating an infant; supports of which the lower portions are connected to one side of the main body part; a hood driving part provided with one or more multi joint link units and pivotably coupled to the supports; a hood which is disposed above the main body part, and opens and closes the main body part by means of the operation of the hood driving part; and a heater which is mounted to the hood driving part and changes position so that a heat radiating part faces away from the main body part when the main body part is closed, and faces the main body part when the main body part is open. Thus, the present invention can be easily converted for use as a warmer.

8 Claims, 7 Drawing Sheets

(56) References Cited

U.S. PATENT DOCUMENTS

| | | | | |
|---|---|---|---|---|
| 6,224,539 | B1 * | 5/2001 | Jones | A61G 11/00 600/22 |
| 6,669,625 | B2 | 12/2003 | Costanzo et al. | |
| 8,419,610 | B2 * | 4/2013 | Matsubara | A61G 11/00 236/2 |
| 11,647,838 | B2 * | 5/2023 | Warren | F16M 13/02 248/277.1 |
| 11,666,412 | B2 * | 6/2023 | Pichler | F16M 11/24 211/85.13 |
| 11,774,033 | B2 * | 10/2023 | Massey | F16M 11/048 248/231.91 |
| 11,788,609 | B2 * | 10/2023 | Laurent | F16M 11/10 248/123.11 |
| 2001/0027267 | A1 | 10/2001 | Jones et al. | |
| 2010/0127144 | A1 * | 5/2010 | Lange | F16M 11/2092 248/284.1 |
| 2015/0065787 | A1 * | 3/2015 | Bohnen | A61N 5/0625 600/22 |
| 2015/0308610 | A1 * | 10/2015 | Zhao | A47B 21/02 74/529 |
| 2017/0340499 | A1 * | 11/2017 | Hampe | A61G 11/006 |
| 2017/0340500 | A1 * | 11/2017 | Hampe | A61G 11/006 |
| 2018/0023758 | A1 * | 1/2018 | Bax | F16M 11/10 248/576 |

FOREIGN PATENT DOCUMENTS

| | | | |
|---|---|---|---|
| JP | 5297879 | B2 | 9/2013 |
| KR | 10-1314188 | B1 | 9/2013 |

* cited by examiner

INCUBATOR

CROSS-REFERENCE TO RELATED APPLICATIONS

This application is a National Stage of International Patent Application No. PCT/KR2021/003665, filed on Mar. 24, 2021, which claims priority to Korean Patent Application No. KR 10-2020-0036127, filed on Mar. 25, 2020, the disclosures of which are incorporated by reference in their entireties.

TECHNICAL FIELD

The present invention relates to an incubator for immature infants or newborns, and more particularly, to an incubator capable of providing a warmer function.

BACKGROUND ART

Incubators are devices for isolating immature infants or newborns with abnormalities and keeping warmth thereof. Generally, an incubator for nursing an immature infant is classified into closed care and open care according to whether to access to the external environment. The closed care is generally referred to as an incubator, and the incubator is configured such that a hood is provided above a space where the immature infant is accommodated to provide a constant temperature and constant humidity to the immature infant. The open care is generally referred to as a warmer, and the warmer is formed in the form similar to that of the incubator and is configured such that a heater is provided above a space where an immature infant is accommodated in a state in which an upper portion of the space is open without a hood to maintain a constant temperature for the immature infant using radiant heat of the heater.

As described above, conventionally, the incubator and the warmer have been separately manufactured. Therefore, when the closed care is replaced with the open care, since an immature infant is transferred from an incubator to a separate warmer, there is a problem in that a sudden change may be caused in a temperature condition around the immature infant and the immature infant may be exposed to infection due to the surrounding environment.

Recently, development of an incubator capable of performing both closed care and open care using a single device is being carried out. For example, U.S. Pat. No. 6,669,625 (hereinafter referred to as Patent Document 1) discloses a technology related to an infant care device provided with a canopy (hood) and a warmer on a platform tub for accommodating an immature infant. However, in the case of the infant care device disclosed in Patent Document 1, since the warmer and the canopy are configured to rotate integrally, it is difficult to provide heat to the immature infant in a state in which an upper portion of the platform tub is completely opened, and accordingly, there is a problem in that it is difficult to switch between an incubator function and a warmer function in a single device.

PATENT DOCUMENT (Patent Document 1) U.S. Pat. No. 6,669,625 (Dec. 30, 2003)

DISCLOSURE

Technical Problem

The present invention is directed to providing an incubator capable of being easily converted for use as a warmer.

Technical Solution

One aspect of the present invention provides an incubator comprising a main body part which has a space formed therein for accommodating an infant, a support having a lower portion connected to one side of the main body part, a hood driving part provided with one or more multi joint link units and pivotably coupled to the support, a hood disposed above the main body part and configured to open or close the main body part due to an operation of the hood driving part, and a heater which is mounted on the hood driving part to allow a heat radiation part to face away from the main body part in a state in which the main body part is closed and of which position is changed to allow the heat radiation part to face the main body part in a state in which the main body part is opened.

Preferably, the multi joint link unit may comprise a first link, a second link having one end hinge-coupled to the first link, a rotating base in which the first link and the second link are installed on one surface and in which a guide groove for guiding movements of the first link and a hinge coupling part of the second link is formed, and a gas spring of which one end is coupled to the first link and the other end is coupled to the rotating base to control an operation of the hood driving part.

Preferably, the hood driving part may be provided with a pair of multi joint link units spaced apart from each other.

In the present invention, the guide groove formed in the rotating base may be formed to extend in a length direction based on the first link and the hinge coupling part of the second link.

In the present invention, the guide groove formed in the rotating base may be formed to extend in a length direction based on the first link and the hinge coupling part of the second link.

In the present invention, the hood driving part may be provided with a friction force controller configured to control a degree of opening and closing of the hood and an operating speed of the hood driving part by controlling a friction force when the hood driving part is rotated, Preferably, the friction force controller may comprise a main body provided with a screw, a rotating shaft configured to pass through a central portion of the main body and pivotably connected to the support, and bushings pressed against and attached to outer diameters of both sides of the rotating shaft and configured to apply an adjustable pressure to an outer circumferential surface of the rotating shaft.

The incubator may further include a hood pivoting block coupled to the second link, connected to a hood fastening part coupled to one side surface of the hood, and configured to rotate the hood at a predetermined angle by being interlocked with the hood driving part.

In this case, the incubator of the present invention may be configured such that, as the first link and the hinge coupling part of the second link are moved along the guide groove of the rotating base, the second link rotates the hood pivoting block in a reverse direction with respect to a direction of the hood driving part so that a continuous operation of the movement of the hood in a vertical direction and the pivoting of the hood at a predetermined angle is performed.

Advantageous Effects

According to the present invention, the functions of the incubator and the warmer can be switched at the same time through a structure of the hood driving part having the multi-joint link unit equipped with the heater. Accordingly, the present invention can provide an incubator capable of performing both closed care and open care using a single device.

In addition, in accordance with the present invention, since a user can manually open or close a hood by pulling a handle provided on an upper surface of the hood, when compared to a case in which an opening or closing of the hood is automatically performed, additional complicated equipment is not required, and it is possible to quickly open or close the hood.

DESCRIPTION OF REFERENCE NUMERALS

Figure 1:
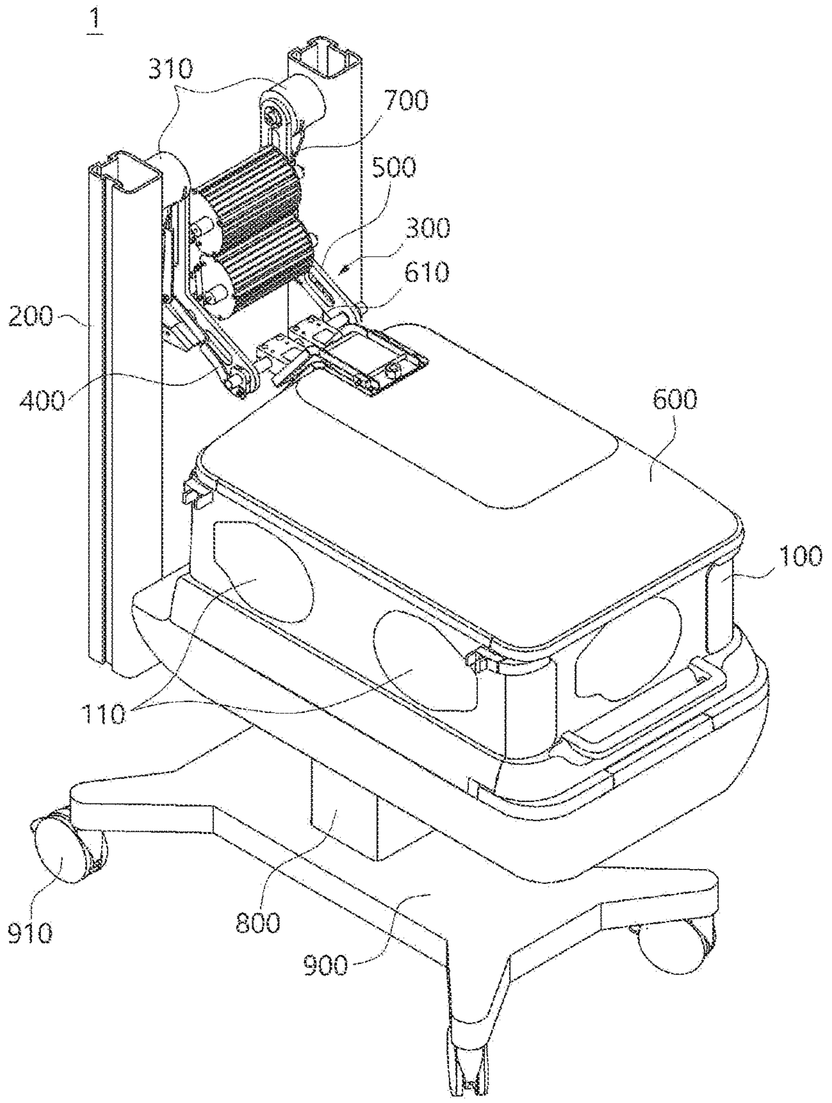
FIG. 1 is a perspective view illustrating an incubator according to one embodiment of the present invention.

1: incubator
100: main body part
110: door
200: support
300: hood driving part
310: friction force controller (pressure control screw)
311: rotating shaft
312 and 313: bushings
314: screw
400: first multi-joint link unit
410: first link
411: first bearing
412: hinge pin screw
413: coupling pin
420: second link
421: shaft screw
430: rotating base
431: guide groove
432: hinge coupling part
433: collar
440: gas spring
441: first coupling member
450: hood pivoting block
460: second coupling member
500: second multi joint link unit
600: hood
610: hood fastening part
700: heater
710: heat radiation part
800: pillar
900: pedestal
910: moving wheel

BEST MODE

Hereinafter, embodiments of the present invention will be described in more detail with reference to the accompanying drawings. However, the following drawings attached to the present specification illustrate exemplary embodiments of the present invention and serve to further assist understanding of the technical idea of the present invention together with the contents of the present invention so that the present invention should not be construed as being limited to details shown in the accompanying drawings.

Figure 2:
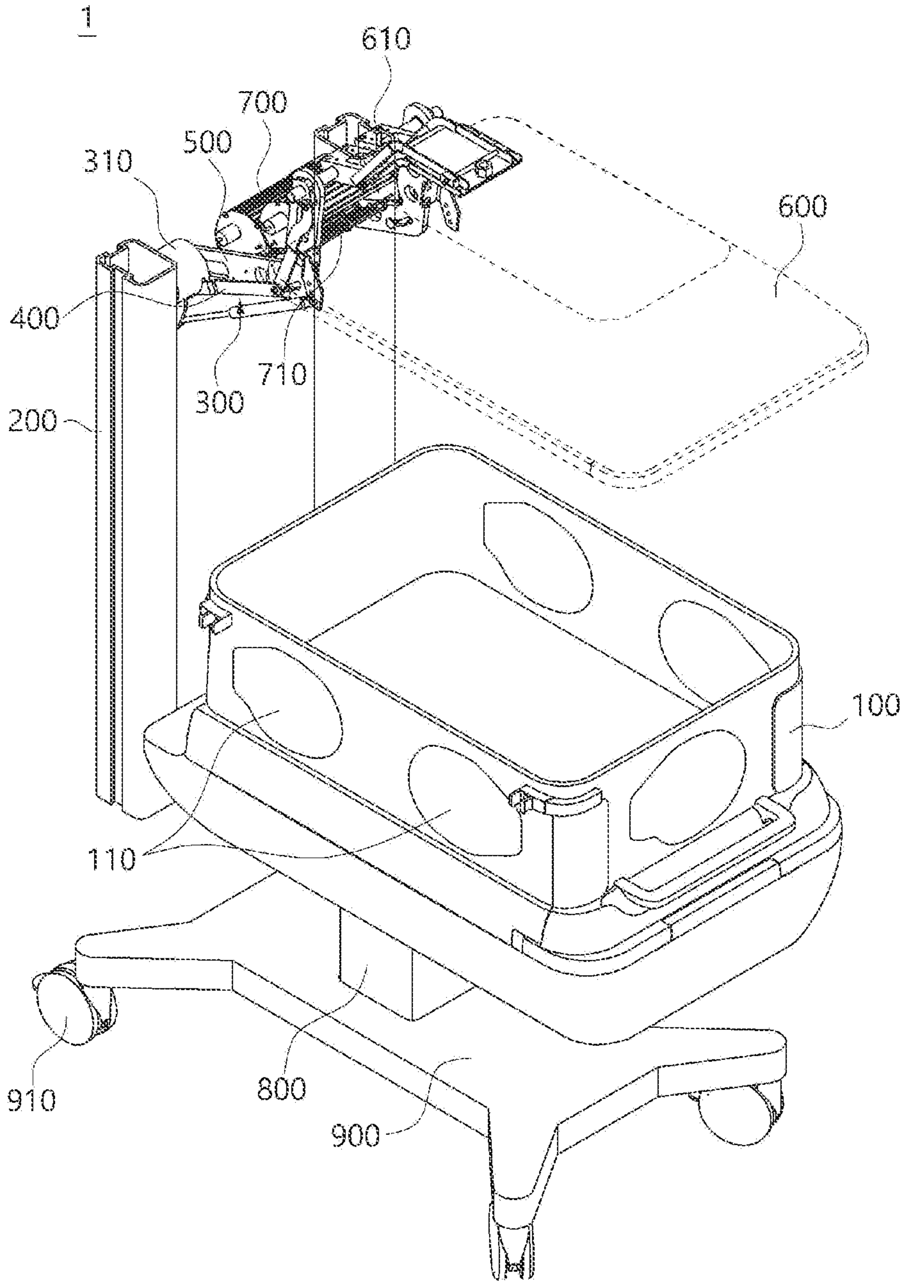
FIG. 2 is a perspective view illustrating the incubator according to one embodiment of the present invention.

FIG. 1 is a perspective view illustrating an incubator 1 according to one embodiment of the present invention, and FIG. 2 is a perspective view illustrating the incubator 1 according to one embodiment of the present invention.

A lower side of a pedestal 900 at the lowermost portion of the incubator 1 is supported by a moving wheel 910, and a pillar 800 is installed at an upper side of the pedestal 900. In addition, a main body part which has a space formed therein for accommodating an infant is provided an upper side of the pillar 800.

The main body part 100 may be provided with a recliner in which a control mechanism (not shown) for controlling a temperature and moisture is installed. The recliner supports a lower end of the main body part 100 and may be installed between a lower side of the main body part 100 and the pillar 800.

A shape and a size of the space formed in the main body part 100 are not particularly limited as long as it can accommodate an infant. For example, a mattress may be disposed inside the main body part 100 so as to provide comfort to an infant. In addition, a hand input window for treating an infant from an outside of the main body part 100 may be formed on a side surface of the main body part 100, and a door 110 for opening or closing the hand input window may be provided.

The incubator 1 of the present invention comprises a support 200 connected to the lower side of the main body part 100.

The support 200 may be formed in pair and the supports 200 may be installed in parallel spaced apart by a predetermined distance. In this case, each support 200 may be in the form of a hollow polygonal cylinder with an open top. In addition, within the scope capable of implementing the purpose of the present invention, it is also possible to install three or more supports 200 in the incubator of the present invention.

A hood 600 capable of opening or closing the main body part 100 due to an operation of a hood driving part 300, which will be described below, is installed above the main body part 100.

In the present invention, the hood 600 is not particularly limited as long as it can isolate an upper portion of the opened incubator from the external environment.

The hood 600 is preferably made of a transparent material to allow a user to check a status of the infant accommodated in the main body part 100 in a closed care state in which the main body part 100 is closed and may be made of an opaque material as necessary.

In one embodiment, the hood driving part 300 includes one or more multi joint link units. The multi joint link unit may be pivotably coupled to the support 200.

For example, in an incubator in which two supports 200 are installed, a first multi joint link unit 400 may be pivotably coupled to any one of the two supports 200, and an interlocking member, which is interlocked with the first multi-joint link unit 400 to operate, may be coupled to the other support 200. The first multi joint link unit 400 and the interlocking member may be pivotably coupled to two supports 200, respectively, spaced apart from each other.

The interlocking member may not include components provided in the first multi joint link unit, and an external shape of the interlocking member, which is identical to and/or similar to that of the first multi joint link unit 400 for a smooth operation of the first multi joint link unit 400, may be formed. Alternatively, the interlocking member may be formed in a shape different from that of the first multi-joint link unit 400 within a range not hindering a movement of the first multi joint link unit. In this case, preferably, the first multi joint link unit 400 and the interlocking member are each coupled to the support 200 by a friction force controller 310, respectively.

According to an exemplary embodiment, the interlocking member may be a second multi joint link unit 500 having a structure which is symmetrical to that of the first multi joint link unit 400 and including the same components.

Hereinafter, a configuration will be described focusing on the first multi joint link unit 400 with reference to FIGS. 3 to 6, but each multi joint link unit, which may be provided in the present invention, includes the same components as those of the first multi joint link unit 400 which will be described below.

Figure 3A:
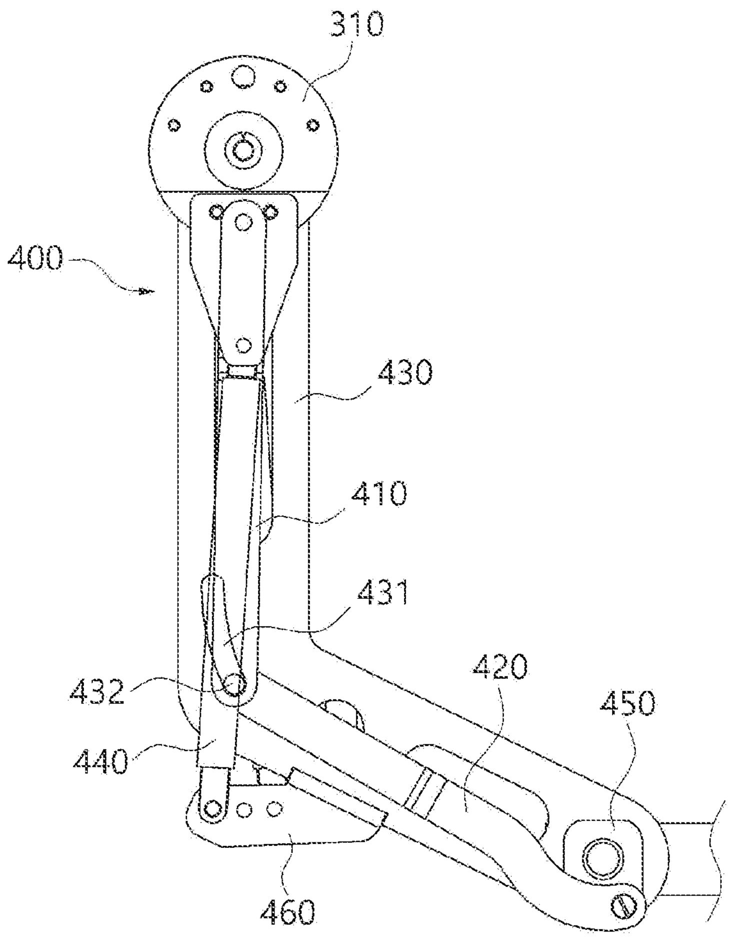
FIG. 3 is a diagram illustrating a first multi joint link unit provided in a hood driving part according to embodiments of the present invention.
Figure 3B:
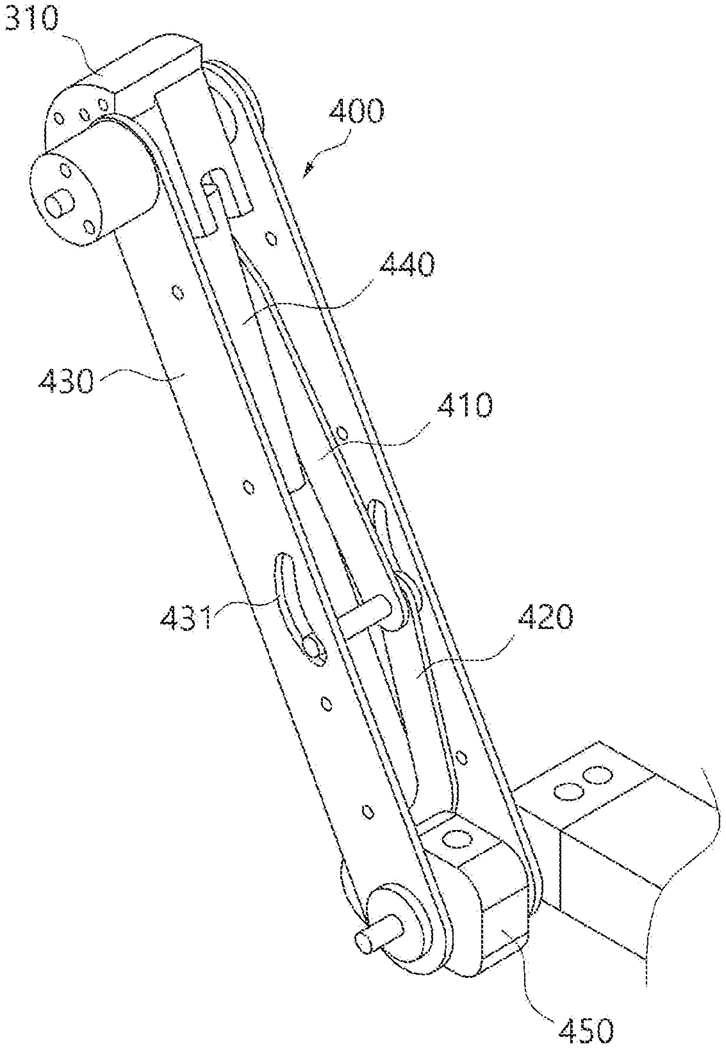
Figure 4:
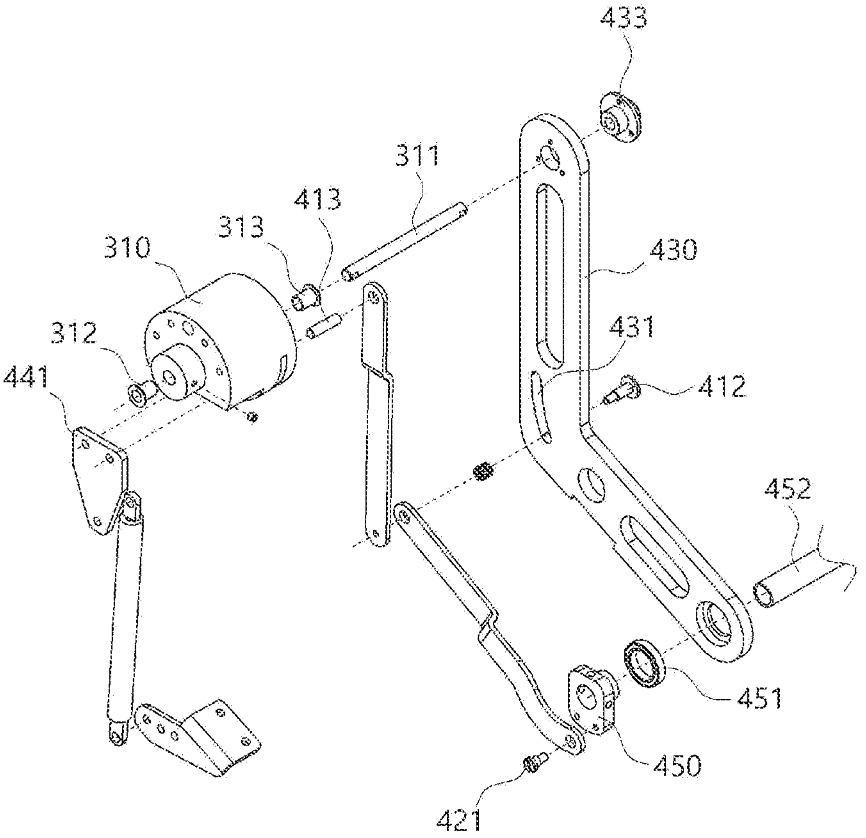
FIG. 4 is an exploded perspective view illustrating the first multi joint link unit provided in the hood driving part according to one embodiment of the present invention.
Figure 5:
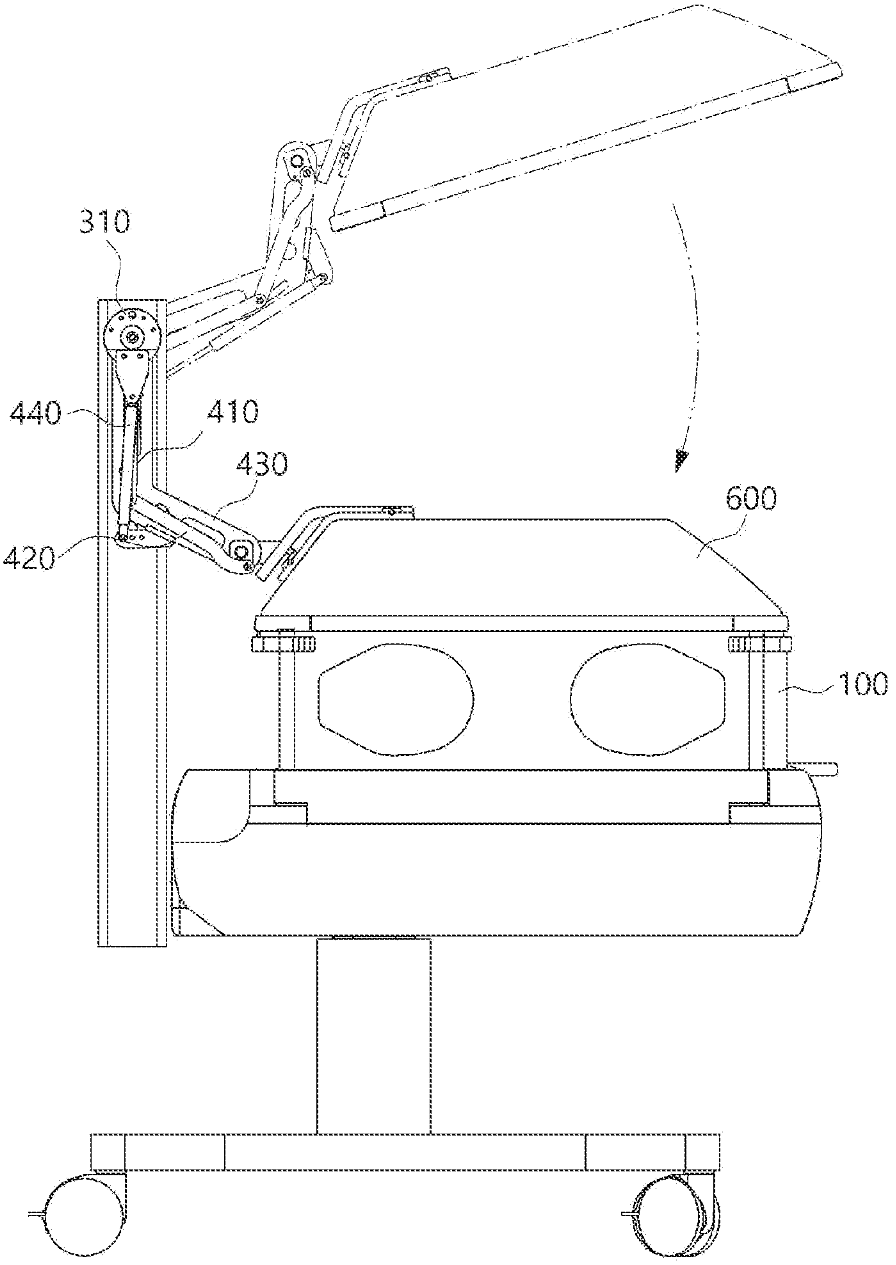
FIG. 5 is a side view illustrating an operation of the hood driving part of the incubator according to one embodiment of the present invention.
Figure 6:
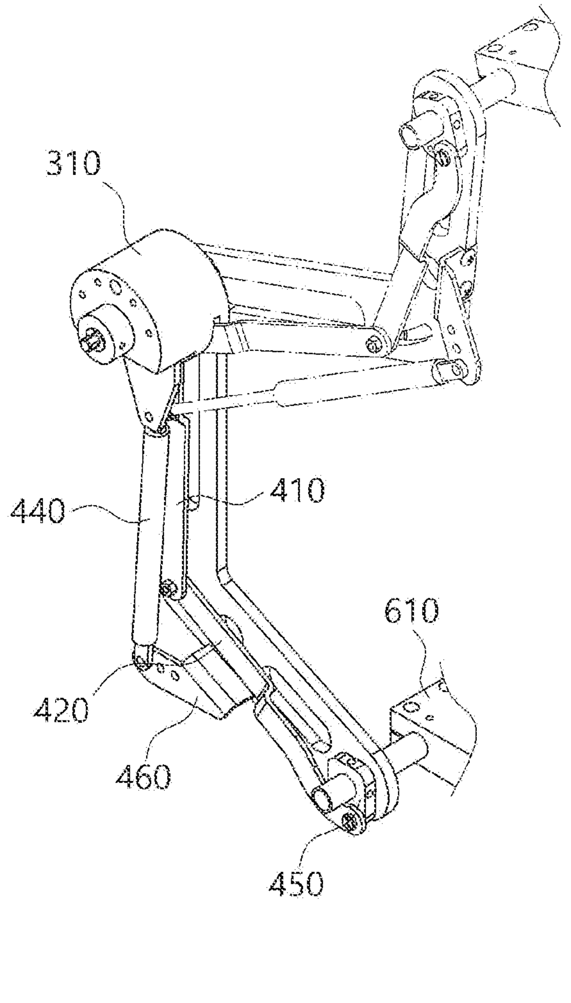
FIG. 6 is a partially enlarged perspective view illustrating an operating state of a multi-joint link unit in the hood driving part of FIG. 4.

FIG. 3 is a diagram illustrating a first multi joint link unit provided in a hood driving part according to embodiments of the present invention, FIG. 3A is a side view illustrating the first multi-joint link unit 400 provided in the hood driving part according to one embodiment of the present invention, and FIG. 3B is a perspective view illustrating the first multi-joint link unit 400 provided in the hood driving part according to another embodiment of the present invention. FIG. 4 is an exploded perspective view illustrating the first multi joint link unit provided in the hood driving part according to one embodiment of the present invention. In addition, FIG. 5 is a side view illustrating an operation of the hood driving part 300 of the incubator 1 according to one embodiment of the present invention, and FIG. 6 is a partially enlarged perspective view illustrating an operating state of the multi joint link units 400 and 500 in the hood driving part 300 of FIG. 5.

First, referring to FIGS. 3 and 4, the first multi joint link unit 400 of the present invention comprises a first link 410, a second link 420, a rotating base 430, and a gas spring 440.

Specifically, one end of the first link 410 is hinge-coupled to the second link 420, and the other end thereof is coupled to the friction force controller 310. In this case, the other end of the first link 410 may be coupled to the friction force controller 310 through a coupling pin 413.

The first link 410 and the second link 420, which are hinge-coupled, are installed on one surface of the rotating base 430.

In the present invention, a shape of the rotating base 430 is not particularly limited. For example, as shown in FIG. 3, the rotating base 430 may be formed by being bent at an obtuse angle based on the hinge coupling parts 432 of the first link 410 and the second link 420 or may be formed in a linear shape.

A guide groove 431 is formed in the rotating base 430 to guide movements of the hinge coupling parts 432 of the first link 410 and the second link 420 due to the operation of the hood driving part 300.

The hinge coupling parts 432 of the first link 410 and the second link 420 may be hinge-coupled by a hinge pin screw 412. The guide groove 431 may have a structure extending in a length direction based on the hinge coupling parts 432 of the first link 410 and the second link 420.

In addition, the hinge coupling part 432 is organically connected to the first bearing 411 and the hinge pin screw 412, and when the hood driving part 300 pivots, the hinge pin screw 412 moves along the guide groove 431 together with the hinge coupling part 432.

In the present invention, the hood driving part 300 is configured to pivot and return in a predetermined angle range. To this end, each of the multi joint link units 400 and 500 of the present invention is provided with the gas spring 440.

One end of the gas spring 440 may be coupled to the friction force controller 310 to which the first link 410 is connected through the first coupling member 441, and the other end thereof may be coupled to the rotating base 430 through a second coupling member 460, thereby controlling the operation of the hood driving part 300.

The gas spring 440 is a well-known spring for buffering, and other gas springs may be substituted and used as long as they can perform the same function.

For example, the gas spring 440 is a component which is compressed by an external force in a state in which a rod is stretched and is elastically stretched again when the external force is released.

Specifically, as shown in FIGS. 5 and 6, in a state in which the upper portion of the main body part 100 is closed by the hood 600, the gas spring 440 is maintained in a compressed state. In addition, when the user opens the main body part 100 by manually pulling upward the hood to pivot the hood driving part 300, a rod of the gas spring 440 is elastically stretched to move upward the hood 600 with a small force, thereby opening the main body part 100, and when the main body part 100 is closed again, a closing speed is reduced due to resistance of the rod to suppress an impact.

The incubator 1 according to one embodiment of the present invention is provided with a heater 700 for controlling a temperature of the space in which the infant is present inside the main body part 100 during open care in which the main body part 100 is opened.

In the present invention, the heater 700 is mounted on the hood driving part 300.

As one example, the heater 700 may be mounted between the first multi joint link unit 400 and the interlocking member. Here, when the interlocking member is the second multi-joint link unit 500, the heater 700 may be mounted between the first link provided in the first multi joint link unit 400 and the first link provided in the second multi joint link unit 500.

In addition, the heater 700 is not particularly limited as long as it is configured to apply heat toward the main body part 100, and the heater 700 may preferably be a general far-infrared emission electric heater.

In the present invention, a position of the heater 700 is changed according to the pivoting of the hood driving part 300.

For example, the heater 700 is configured to be moved between a standby position (a first position) during closed care in which the hood 600 is in a closed state and a position (a second position) during open care in which the hood 600 is in an opened state. The heater 700 is positioned parallel to the support 200 at the first position. In this state, a heat radiation part 710 of the heater 700 is positioned to face away from the main body part 100 of the incubator 1. Meanwhile, when the user pulls upward the hood 600 using a handle (not shown) on the hood 600, the hood driving part 300 connected to the hood 600 is pivoted with respect to the support 200 to be moved to the second position. Accordingly, the position of the heater 700 mounted between the first and second multi-joint link units 400 and 500 of the hood driving part 300 is also rotated around the rotation shaft. At the second position, the heat radiation part is positioned to face the main body part 100 so that a temperature of the space inside the main body part 100 may be more effectively controlled. Therefore, when the heater 700 is positioned at the second position, the incubator 1 of the present invention may be used as a warmer by switching a function of the incubator 1.

As described above, according to the present invention, by operating the hood driving part 300 having the multi joint link units, it is possible to quickly switch the function between the incubator and the warmer.

Meanwhile, in the present invention, the friction force controller 310 may be used to control a degree of opening and closing of the hood 600 and operate speed of the hood driving part 300 by controlling a friction force when the hood driving part 300 is rotated.

Preferably, the friction force controller 310 is a pressure control screw configured to control the degree of opening and closing of the hood 600, control the friction force of the hood driving part 300, and adjust the operating speed of the hood driving part 300. In the present specification, reference numeral 310 may denote a "friction force controller" or a "pressure control screw."

The pressure control screw 310 comprises a main body provided with a screw 314, a rotating shaft 311 configured to pass through a central portion of the main body and pivotably connected to the support 200, and bushings 312 and 313 pressed against and attached to outer diameters of both sides of the rotating shaft 311 and configured to apply an adjustable pressure to an outer circumferential surface of the rotating shaft 311. The bushings 312 and 313 transmit a pressing force generated when the user rotates the screw 314 of the main body of the pressure control screw 310 to the outer circumferential surface of the rotating shaft 311 so that the friction force when the hood driving part 300 is rotated and a rotation speed of the hood driving part 300 may be controlled.

The incubator 1 according to one embodiment of the present invention may further include a hood pivoting block 450.

Referring to FIGS. 3 and 4, the second link 420 is pivotably coupled to one side surface of the hood pivoting block 450, and the hood pivoting block 450 is connected to a rotation shaft 452 of a hood fastening part 610 coupled to one side surface of the hood 600 with a bearing 451 interposed therebetween. Accordingly, when the hood 600 is opened or closed, the hood driving part 300 and the hood 600 are relatively rotatable. The second link 420 may be coupled to the hood pivoting block 450 through a shaft screw 421. Specifically, in the incubator 1 of the present invention, when the rotating base 430 integrally coupled to the collar 433 and the rotating shaft 311 is rotated around an axis of the rotating shaft 311 through the hood driving part 300, the hinge coupling parts 432 of the first link 410 and the second link 420 are organically moved along the guide groove 431 of the rotating base 430, and in this case, the second link 420 rotates the hood pivoting block 450 in a direction opposite to the pivoting direction of the hood driving part 300. Accordingly, the hood 600 is configured to perform a continuous operation of being moved in a vertical direction and pivoting at a predetermined angle.

[Modes of the Invention]

According to the present invention, the functions of the incubator and the warmer can be switched at the same time through a structure of the hood driving part having the multi joint link unit equipped with the heater. Accordingly, the present invention can provide an incubator capable of performing both closed care and open care using a single device.

INDUSTRIAL APPLICABILITY

In accordance with the present invention, since a user can manually open or close a hood by pulling a handle provided on an upper surface of the hood, when compared to a case in which an opening or closing of the hood is automatically performed, additional complicated equipment is not required, and it is possible to quickly open or close the hood.

The invention claimed is:

1. An incubator comprising:

a main body part which has a space formed therein for accommodating an infant;

a support having a lower portion connected to one side of the main body part;

a hood driving part provided with one or more multi-joint link units and pivotably coupled to the support;

a hood disposed above the main body part and configured to open or close the main body part due to an operation of the hood driving part; and a heater which is mounted on the hood driving part with the hood mounted to allow a heat radiation part to face away from the main body part in a state in which the main body part is closed and of which position is changed to allow the heat radiation part to face the main body part in a state in which the main body part is opened, wherein the heater is configured such that its position varies according to the operation of the hood driving part for driving the hood.

2. The incubator of claim 1, wherein the multi-joint link unit comprises:

a first link;

a second link having one end hinge-coupled to the first link;

a rotating base in which the first link and the second link are installed on one surface and in which a guide groove for guiding movements of hinge coupling parts of the first link and the second link is formed; and a gas spring of which one end is coupled to the first link and of which the other end is coupled to the rotating base to control an operation of the hood driving part.

3. The incubator of claim 1, wherein the hood driving part is provided with a pair of multi-joint link units spaced apart from each other.

4. The incubator of claim 2, wherein the guide groove is formed to extend in a length direction based on the hinge coupling parts of the first link and the second link.

5. The incubator of claim 1, wherein the hood driving part is provided with a friction force controller configured to control a degree of opening and closing of the hood and an operating speed of the hood driving part by controlling a friction force when the hood driving part is rotated.

6. The incubator of claim 5, wherein the friction force controller comprises:

a main body provided with a screw;

a rotating shaft configured to pass through a central portion of the main body and pivotably connected to the support; and bushings pressed against and attached to outer diameters of both sides of the rotating shaft and configured to apply an adjustable pressure to an outer circumferential surface of the rotating shaft.

7. The incubator of claim 2, further comprising:

a hood pivoting block coupled to the second link, connected to a hood fastening part coupled to one side surface of the hood, and configured to rotate the hood at a predetermined angle by being interlocked with the hood driving part.

8. The incubator of claim 7, wherein as the hinge coupling parts of the first link and the second link are moved along the guide groove of the rotating base, the second link rotates the hood pivoting block in a reverse direction with respect to a direction of the hood driving part so that a continuous operation of the movement of the hood in a vertical direction and the pivoting of the hood at a predetermined angle is performed.

* * * * *